No. 732,199. PATENTED JUNE 30, 1903.
S. C. LINES.
VEHICLE WHEEL TIRE.
APPLICATION FILED DEC. 28, 1902.
NO MODEL.
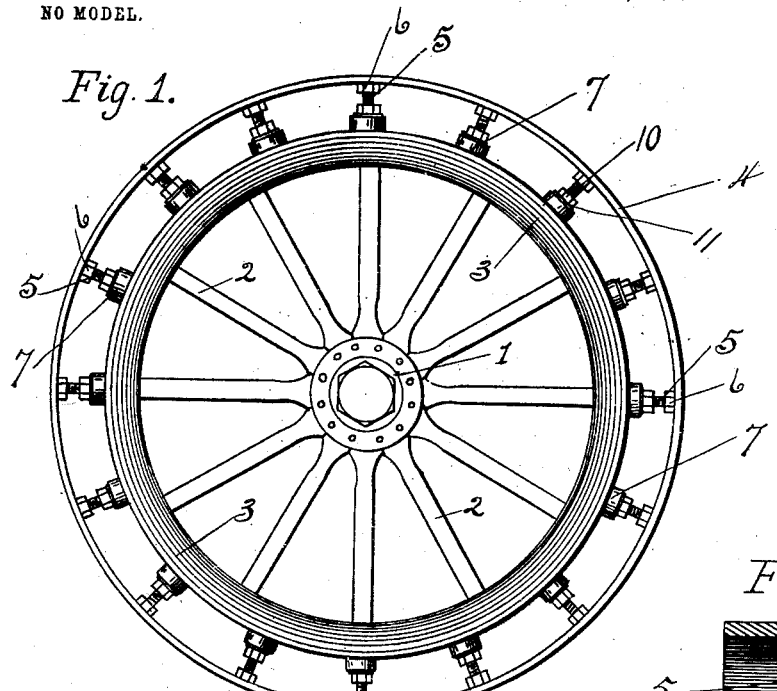
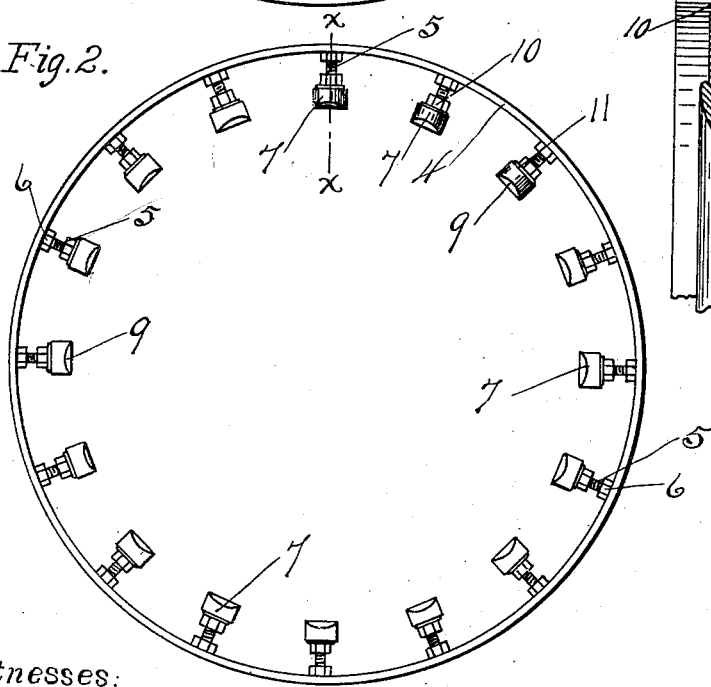
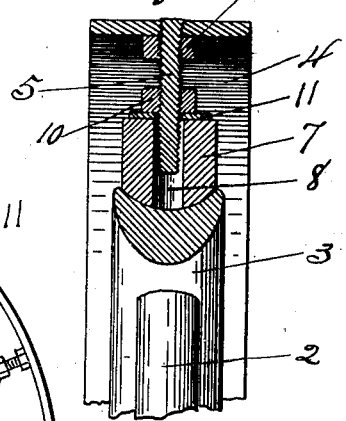
Witnesses:
David C. Walter
Powell Schreiber
Inventor:
Samuel C. Lines,
By Owen & Owen
His attorneys.
THE NORRIS PETERS CO., PHOTO-LITHO., WASHINGTON, D. C.

No. 732,199. Patented June 30, 1903.

UNITED STATES PATENT OFFICE.

SAMUEL C. LINES, OF CURTICE, OHIO.

VEHICLE-WHEEL TIRE.

SPECIFICATION forming part of Letters Patent No. 732,199, dated June 30, 1903.

Application filed December 26, 1902. Serial No. 136,594. (No model.)

*To all whom it may concern:*

Be it known that I, SAMUEL C. LINES, a citizen of the United States, residing at Curtice, in the county of Ottawa and State of Ohio, have invented certain new and useful Improvements in Vehicle-Wheel Tires; and I do hereby declare the following to be a full, clear, and exact description of my invention, such as will enable others skilled in the art to which it appertains to make and use the same, reference being had to the accompanying drawings, and to the figures of reference marked thereon, which form a part of this specification.

My invention relates to a supplemental tire or tread for use on automobile and other vehicle wheels of that class in which a pneumatic tire or resilient tread portion is provided to absorb vibration; and it consists of a supplemental tire or tread carrying a plurality of rubber blocks adapted to find bearings in the ordinary concave periphery of such wheels.

The primary object of my invention is to provide a resilient tire of novel and improved construction that may be readily and easily applied to the ordinary vehicle-wheel of the class above described in cases of emergency, such as the puncturing or otherwise disabling of the pneumatic or rubber tire, without defacing or injuring the rim of such wheel in any way and that may be conveniently carried in the vehicle by tourists for immediate application in case of such disabling of the tire.

While the essential features of my invention are necessarily susceptible of modification, still the preferred embodiment thereof is illustrated in the accompanying drawings, in which—

Figure 1 is a view of a vehicle-wheel equipped with my improved tire. Fig. 2 is a view of the tire detached from the wheel; and Fig. 3 is a cross-sectional view of the supplemental tire and wheel-rim, taken on the dotted line $x$ $x$ in Fig. 2.

Like figures of reference mark the same parts in all the figures of the drawings.

Referring now to the drawings, 1 represents the hub; 2, the spokes, which may be either of wire or wood, and 3 the concave rim of an ordinary vehicle-wheel of the class above described.

4 represents a metal tire or tread of greater diameter than the rim 3, to the inner periphery of which I rivet or otherwise rigidly secure within suitable apertures provided therein the inwardly-projecting bolts 5, the same being reinforced and prevented from any outward or longitudinal movement in said tire by means of the nuts 6, which are turned tightly against the inner periphery of the tire.

7 represents blocks of rubber or other yielding substance adapted to rest in the concave periphery of the rim 3 of the wheel and to receive the projecting ends of the bolts 5. These blocks 7 are provided with a central channel or bore 8, within which the ends of the bolts 5 loosely rest, and they have their lower or inner surfaces convexed, as shown at 9, to conform to the concave periphery of the rim 3. In order to support the tire 4 and hold the same in proper relation to the rim 3 of the wheel and also to retain the blocks 7 within the periphery of the rim, I provide the adjustable bearing-nuts 10 and washers 11, which bear against the outer portions of the blocks 7. Normally the blocks 7 maintain the tire and rim in proper relation; but when the tire is depressed or displaced inwardly in riding said blocks permit it to yield and absorb vibration in the same manner as the ordinary pneumatic tire.

When the tire is properly secured to the rim of a wheel, the ends of the bolts 5 are supported a sufficient distance above the rim 3 of the wheel by means of the blocks 7, as shown in Fig. 3, to permit them to vibrate and have a longitudinal play in said blocks when riding without striking and injuring the rim.

In placing my tire on or removing the same from a wheel it will only be necessary to loosen the bearing-nuts 10 on one-half of the tire sufficiently to permit of the blocks 7 on that half being forced over the edge of the rim 3, the said nuts being then properly tightened and adjusted to retain the tire 4 on and in proper relation to the rim 3 of the wheel.

It is apparent that if desired my improved tire may entirely take the place of the pneumatic tire now in use, and thus obviate the necessity of continually repairing punctures and placing new tires on the wheels, such being the case with tires used on heavy vehicles, especially in country travel, or it may be used simply as an emergency-tire to be placed on the wheel after the removal of the disabled tire.

Having thus described my invention, what I claim as new, and desire to secure by Letters Patent, is—

1. A supplemental tire or tread carrying a plurality of blocks of a yielding substance, said blocks adapted to find bearings in the ordinary concave periphery of a vehicle-wheel.

2. The combination, with a vehicle-wheel carrying a rim having a concave periphery, of a supplemental tire or tread carrying a plurality of rubber blocks adapted to find bearings in the concave periphery of said rim.

3. The combination, with a vehicle-wheel provided with a concave periphery, of a supplemental tire, a plurality of supporting members secured to the inner periphery of said tire, a rubber block carried by each of said supporting members and adapted to find bearing in the concave periphery of said wheel, and means provided for adjusting said blocks with relation to said wheel.

4. The combination, with a vehicle-wheel provided with a concave periphery, of a supplemental tire or tread, a plurality of inwardly-projecting bolts secured to the inner periphery of said tire or tread, a block of yielding substance carried by each of said bolts and adapted to rest in the concave periphery of said wheel and so shaped as to conform to the contour thereof, and nuts threaded on said bolts and adapted to bear against said blocks and retain the said tire in proper adjustment to said wheel.

In testimony whereof I have subscribed my name to this specification in the presence of two witnesses.

SAMUEL C. LINES.

Witnesses:
WILBER A. OWEN,
EMIL J. VOGELSANG.